United States Patent
Miyagawa

[15] 3,683,777
[45] Aug. 15, 1972

[54] AUTOMATIC FOCUS CONTROL DEVICE FOR PHOTOGRAPHIC CAMERAS

[72] Inventor: Fumihiro Miyagawa, Tokyo, Japan

[73] Assignee: Kabushiki Kaisha Ricoh, Tokyo, Japan

[22] Filed: Oct. 6, 1970

[21] Appl. No.: 78,417

[30] Foreign Application Priority Data

Oct. 13, 1969 Japan..................44/82079

[52] U.S. Cl..................95/44 R, 355/56, 355/58
[51] Int. Cl..................................G03b 3/00
[58] Field of Search......95/44 R, 44 B, 44 C; 355/56, 355/58

[56] References Cited

UNITED STATES PATENTS

| | | | |
|---|---|---|---|
| 3,443,502 | 5/1969 | Harvey | 95/44 R |
| 3,562,785 | 2/1971 | Craig | 95/44 R |
| 3,274,914 | 9/1966 | Biedermann et al. | 95/44 R |

Primary Examiner—Samuel S. Matthews
Assistant Examiner—Richard A. Wintercorn
Attorney—McGlew and Toren

[57] ABSTRACT

An automatic focus control device for including a distance setting ring for focusing a taking lens, and an adjusting ring for a light receiving lens, a shutter operating button and a shutter release member includes a rack member engaged with external gear teeth on the setting ring and mounted for longitudinal reciprocation. A drive slide is mounted parallel to the rack member for longitudinal reciprocation, and a spring biases the slide toward a shutter release member. A disk movable in accordance with advance of the film operates a lever to conjointly displace both the rack member and the slide against the bias of the spring and a position where the rack member and the slide are releasably latched by locking means which is released by the shutter operating button. A catch on the slide engages a laterally extending pin on the rack member so that the rack member is moved conjointly with the slide when the shutter button is operated. An electromagnet is operable to release this latch member and receives an electric signal from photoelectric transducers associated with the light receiving lens and providing an electric output signal corresponding to the distance of a subject from the camera. When the subject is in proper focus, the electromagnet is energized to release the latch so that the rack member remains stationary while the slide continues its movement to operate the shutter release.

10 Claims, 3 Drawing Figures

PATENTED AUG 15 1972

3,683,777

INVENTOR.
FUMIHIRO MIYAGAWA
BY McGlew and Toren
ATTORNEYS

AUTOMATIC FOCUS CONTROL DEVICE FOR PHOTOGRAPHIC CAMERAS

BACKGROUND OF THE INVENTION

Many proposals for automatically effecting focusing control in photographic cameras have already been made. Conventional means for detecting whether or not the subject is in proper focus are broadly divided into three types, including those which utilize the output characteristics of photoelectric transducer elements, those which utilize the fuzziness of an image caused by the distance between the camera and the subject, and those which utilize coalescing of images. Anyone of these three types of means must be combined with control means for effecting automatic control of the focusing. A disadvantage of known arrangements is that usually an electric motor or the like is required to effect the automatic adjustment of the focus.

SUMMARY OF THE INVENTION

This invention relates to automatic focus controls for photographic cameras, and, more particularly, to a novel, simplified and inexpensive automatic focus control device which does not require any electric motor.

The present invention is more particularly directed to control means coupled to a focusing detection means. Thus, the automatic focusing control device of the invention is characterized in that no electric motor is used and that the control means comprises two movable members, one of which is arranged to be moved in one direction under the bias of the spring and the other of which moves with the one member under certain conditions. The device is simple in construction, dependable in performance and low in cost.

The automatic focus control device of the invention is intended for use with photographic cameras of the type in which focusing is effected by rotating a distance setting ring while focusing a taking lens. Rotation of this setting ring is automatically controlled in accordance with the distance between the subject and the camera, so that proper focusing can be effected automatically.

In accordance with the invention, one movable member constitutes a movable rack coupled with the distance setting ring through external gear teeth on the setting ring, and further comprises another movable member, in the nature of a slide, which is movable parallel to the rack member and biased, in one direction of movement, by a spring. The rack member is arranged to be moved with the slide as a unit until proper focusing has been effected.

The focus detection means of the invention focus control device comprises photoelectric transducer elements adapted to produce an electric output signal corresponding to the distance between the camera and the subject, and further includes an electromagnet. The distance setting ring is rotated by the rack member before the shutter is released, release of the shutter being effected by the slide member. The rack member and the slide member are releaseably coupled to each other for movement as a unit responsive to operation of a shutter button, and the electromagnet is energized, when the taking lens is properly focused, to release the coupling between the rack member and the slide member. This stops rotation of the setting ring while the slide member continues to move and operates the shutter release at the end of its movement.

An object of the invention is to provide an automatic focusing control device which is simple in construction, dependable in performance and low in cost.

Another object of the invention is to provide such a control device which is cooperable with the setting ring of a camera to focus a taking lens.

Another object of the invention is to provide such an automatic focusing control device which does not require any electric motor.

Another object of the invention is to provide such an automatic focus control device including means providing an electrical output signal corresponding to the distance between the subject and the camera and which signal, when the taking lens is properly focused on the subject, energizes an electromagnet to interrupt further adjustment of the setting ring.

For an understanding of the principles of the invention, reference is made to the following description of a typical embodiment thereof as illustrated in the accompanying drawing.

DESCRIPTION OF THE PREFERRED EMBODIMENT

Figure 1:
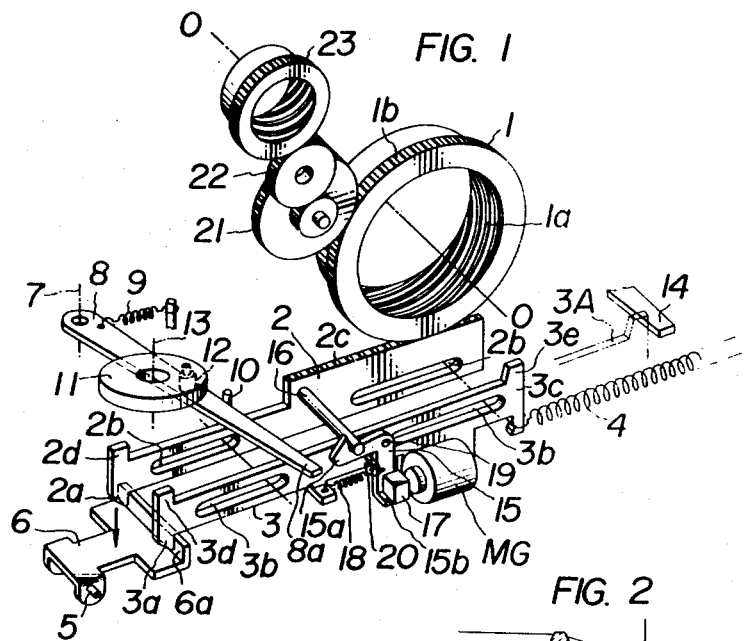
FIG. 1 is a perspective view of one embodiment of automatic focus control device for photographic cameras in accordance with the invention.

Referring to FIG. 1, a rotatable distance setting ring 1 has a helical groove 1a formed on its inner circumferential surface and arranged to be threadedly engaged with the cylinder of a taking lens so that the taking lens may be axially reciprocated along optical axis O—O as setting ring 1 is rotated. Gear teeth 1b are formed on the outer peripheral surface of setting ring 1, to constitute an external ring gear, which meshes with a rack 2c on the upper edge of a movable member 2 arranged in side-by-side relation with a drive member 3.

Movable member 2 and drive member 3 are formed with guide slots 2b, 2b, and 3b, 3b, respectively, to receive suitable pins or the like to provide for reciprocation of members 2 and 3 in a direction normal to optical axis 0—0. A tension spring 4 has one end secured to a fixed point (not shown) and a second end secured to the right hand end 3c of drive member 3, so as to bias drive members 3 to the right as viewed in FIG. 1. The front ends of movable member 2 and drive member 3 are formed with respective hooks 2a and 3a which are arranged, when members 2 and 3 have moved to the left in FIG. 1, to be engaged and locked by an upwardly bent portion 6a at the free end of a locking member 6 pivotally supported, at its base, by a shaft 5. Hooks 2a and 3a are unlocked when a shutter button of the camera is depressed, and locking member 6 is pivoted in the direction of the arrow about shaft 5.

The upper edge of drive member 3 is cut away throughout nearly its entire length, leaving upwardly directed projections 3d and 3e at its front and rear ends, respectively. The upper edge of movable member 2 is cutaway in its left half portion, leaving an upwardly directed projection 2d at its front end which is aligned with the upwardly directed projection 3d of drive member 3. A pivotal lever 8 is pivotally supported by a shaft 7 and has a free end portion 8a which extends across the cut out portions of members 2 and 3. A spring 9 having one end connected to a fixed point has its other end connected to lever 8 near shaft 7, and biases lever 8 to swing counterclockwise, as viewed from above in FIG. 1, until it engages a stop 10.

A disk 11 is disposed above lever 8 and carries a downwardly directed pin 12 which is in engagement with one side edge of lever 8. Disk 11 is adapted to make one complete revolution about a shaft 13 in conjunction with advance movement of the film. When disk 11 makes one complete revolution, lever 8 is moved, by pin 12, clockwise about shaft 13 against the bias of spring 9, so that its free end portion 8a abuts against the upwardly directed projections 2d and 3d of members 2 and 3, respectively, and moves these members to the left so that the respective hooks 2a and 3a may be locked in position by locking member 6. If hooks 2d and 3d are unlocked, then drive member 3 is moved to the right, to return to its original position, by the bias of spring 4 and, at the end of the return movement of drive member 3, its projection 3e impinges on a shutter release member 14, as shown in the dash-dot position 3A, to open and close the shutter of the camera.

A bell crank 15 is pivotally mounted on a shaft 19 on the front side of drive member 3 and substantially at the center portion of the latter. A laterally projecting pin 16 is secured to the front side of member 2, facing member 3, substantially at the central portion of member 2. Bell crank 15 and pin 16 cooperate with each other in such a manner that members 2 and 3 may be moved as a unit under certain conditions, and for this purpose bell crank 15 has, at the end of its generally horizontally extending arm, a hook 15a arranged to engage pin 16 as illustrated in FIG. 1. An iron armature 17 is secured to the end 15b of the other arm of bell crank 15. and an electromagnet MG is mounted on member 3 in a position to attract armature 17. A spring 18 biases bell crank 15 to rotate clockwise as viewed in FIG. 1, and such clockwise movement is limited by stop 20.

When electromagnet MG is energized sufficiently to attract armature 17 on end 15b of bell crank 15, the bell crank swings counterclockwise about shaft 19 against the bias of spring 18, thereby to release hook 15a from engagement with pin 16. It will be noted that when hook 15a is maintained in engagement with pin 16, drive member 3 and movable member 2 move as a unit normal to optical axis 0—0, and that, when hook 15a is released from engagement with pin 16, only drive member 3 is moved to the right by the bias of spring 4.

Gear teeth 1b on the outer circumferential surface of distance setting ring 1 mesh with a stepped gear 21 which, through an intermediate gear 22, operates a light receiving lens movement adjusting ring 23. Adjusting ring 23 is adapted to move a light receiving lens, in conjunction with axial reciprocation of the taking lens, backwardly and forwardly along a path of movement parallel to optical axis 0—0. When setting ring 1 is caused to rotate clockwise by rack 2a to move the taking lens forwardly relative to a photosensitive film, adjusting ring 23 is rotated, conjointly with rotation of setting ring, to move the light receiving lens forwardly.

Figure 2:
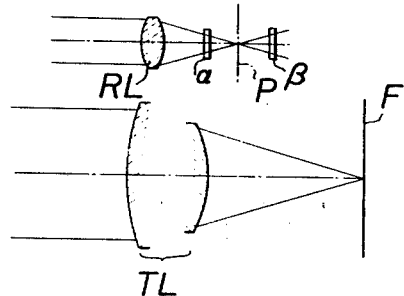
FIG. 2 is a diagrammatic illustration of the optical system of the device shown in FIG. 1.

Referring to FIG. 2, light flux entering light receiving lens RL will focus on the rearwardly disposed focal plane P in the same manner as light flux entering through taking lens TL focuses on the plane of photosensitive film F. Light receiving members $\alpha$ and $\beta$, for detecting whether or not the subject is in focus, are disposed forwardly and rearwardly, respectively, of focal plane P and are spaced equal distances from focal plane P.

It is to be understood that the mentioned focal planes represent those for the case in which the distance between the subject and the camera is infinity, and the respective light rays incident on taking lens TL and light receiving lens RL are parallel rays. Therefore, if there is a variation in the distance between the subject and the camera, there will occur a change in the position of the focal plane. If the distance between the subject and the camera is reduced, the focal plane will be displaced rearwardly. To compensate this change in position of the focal plane, distance setting ring 1 is rotated to move taking lens TL forwardly so as to cause the focal plane to be disposed in the plane of film F.

Figure 3:
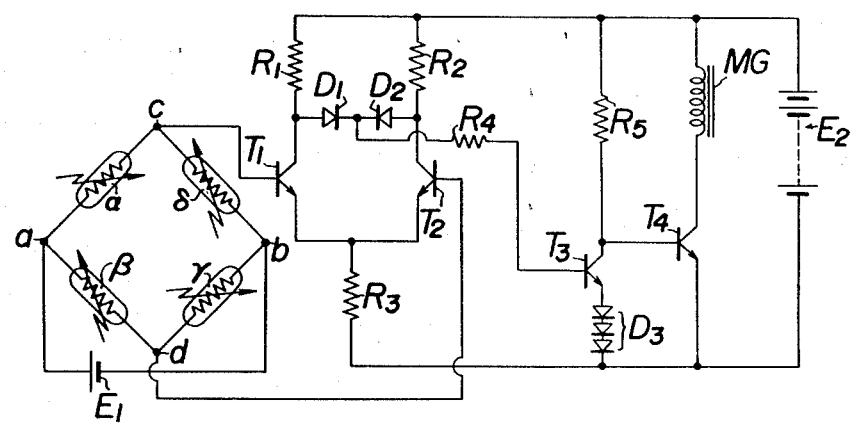
FIG. 3 is a schematic wiring diagram of one embodiment of focusing detection means producing an electrical signal of a predetermined value when the subject is in focus.

The means for detecting the focusing of the subject, in accordance with the present invention, comprises the photoelectric transducer elements $\alpha$ and $\beta$ disposed forwardly and rearwardly, respectively, of the focal plane of the light receiving lens RL, in association with photoelectric transducer elements $\gamma$ and $\delta$, the four photoelectric transducer elements forming a bridge circuit as best seen in FIG. 3. The detection means operates in a manner such that a variation in the light incident on the light receiving lens RT coupled through taking lens TL is detected by photoelectric transducer elements $\alpha$ and $\beta$. When the subject is brought into focus by movement of light receiving lens RL, the light rays incident on photoelectric transducer elements $\alpha$ and $\beta$ are equal in magnitude, so that the bridge circuit is balanced and produces an electrical signal indicating that the subject is in focus.

In FIG. 3, input terminals $a$ and $b$ of the bridge circuit consisting of photoelectric transducer elements $\alpha$ $\beta$ $\gamma$ and $\delta$, are connected to a source of potential, such as an electric cell $E_1$. The bridge output terminals $c$ and $d$ are connected to the bases of respective transistors T1 and T2. Fixed resistors R1 and R2 are connected to the collectors of the respective transistors T1 and T2, and the respective emitters are commonly connected, through a fixed resistor R3, to a power source E2, such as a battery, which applies a predetermined voltage to the emitters of transistors T1 and T2.

Diodes D1 and D2 are arranged in back to back relation and are connected to the respective collectors of transistors T1 and T2. These diodes are connected in opposition to each other at a junction which, in turn, is connected through a resistance R4 to the base of a transistor T3. A biasing diode unit D3 is connected to the emitter of transistor T3, and a resistor R5 is connected to the collector of transistor T3 and to the base of a transistor T4 which is triggered conductive when the bridge circuit is balanced. Electromagnet MG, mounted on drive member 3, is connected in the collector circuit of transistor T4.

The focusing detecting electric circuit illustrated in FIG. 3 has an output potential at output terminals c or d because the bridge circuit is unbalanced when the subject is not in focus. This potential triggers transistor T1 or transistor T2 conductive, and the collector current of the respective transistor T1 or T2 triggers transistor T3 conductive. Diodes D1 and D2 function to maintain the voltage applied to the base of transistor T3 constant. When the bridge circuit is unbalanced, diodes D1 and D2 apply a predetermined triggering voltage to the base of transistor T3 so that current flows through resistor R5, the collector-emitter circuit of transistor T3 and the diode unit D3. Thereby, transistor T4 does not conduct.

When the subject is brought into focus, the light fluxes incident on photoelectric transducer elements $\alpha$ and $\beta$ become equal, thereby balancing the bridge. Under these conditions, the transistors T1 and T2, and the transistor T3, are rendered non-conductive immediately because there is no output voltage from the bridge. As a result, the current flowing to transistor T3 is switched and flows to the base of transistor T4 triggering transistor T4 conductive. This energizes electromagnet MG which attracts the armature 17 on the arm 15b of bell crank 15, to pivot this bell crank to release rod 16 so that movable member 2 is disconnected from drive member 3.

The automatic focus control device as described above operates in the manner which will now be explained. If the camera is directed at a subject, with the distance between the camera and the subject not being infinity, and a shutter button (not shown) is depressed, locking member 6 is pivoted in the direction of the arrow in FIG. 1, thereby to unlock movable member 2 and drive member 3. The two members thus move, as a unit, to the right in FIG. 1, under the bias of spring 4. If, at this time, the subject is not in focus, the bridge circuit is not balanced, so that no current flows to the base of transistor T4 and electromagnet MG remains inoperative. Thus, movable member 2 and drive member 3 are interconnected as a unit due to the engagement of bell crank 15 with pin 16.

As movable member 2 moves to the right, rack 2c, in engagement with distance setting ring 1, rotates this ring about optical axis 0—0, thereby moving taking lens TL forwardly. Light receiving lens RL is also moved forwardly due to the coupling of adjusting ring 23 to setting ring 1. Movement of lens RL results in movement of the focal plane until it reaches a position in which the subject is in focus, and the light fluxes incident on photoelectric transducer elements $\alpha$ and $\beta$ become equal in magnitude or volume.

This causes the bridge circuit to come into balance, so that transistor T3 is triggered to the blocking state and the current flowing through resistor R5 flows to the base of transistor T4. Thereby, electromagnet MG is actuated and attracts armature 17 on the arm 15b of bell crank 15, against the bias of spring 18. As armature 17 is attracted to electromagnet MG, pivoting bell crank 15 counterclockwise, movable member 2 is released from engagement with drive member 3 and only drive member 3 continues to be moved by the bias of spring 4, with movable member 2 remaining stationary. The position in which movable member 2 becomes stationary is that position in which the subject is in focus on taking lens TL. Drive member 3 continues to move, with movable member 2 remaining stationary, and its rear projection 3e engages shutter release member 14 at the end of movement of drive member 3, so that the shutter is opened and closed to complete the picture taking.

When the film is advanced, disk 11 is rotated and pivotal lever 8 abuts against the respective projection 2d and 3d of members 2 and 3, thereby moving these members to the left against the bias of spring 4 and bringing the respective hooks 2a and 3a into engagement with locking member 6. At this time, no current flows through electromagnet MG, so that bell crank 15 and pin 16 are interengaged under the bias of spring 18 so that the members 2 and 3 form a unit.

From the foregoing description, it will be appreciated that the control means of the automatic focus control device of the invention comprises two movable members, one arranged to be moved in one direction under the bias of a spring and the other arranged to move with the spring biased member as a unit until focusing has been effected. The construction thus is simple, compact in size and low in cost, as well as not requiring an electric motor such as is the case with conventional focused control device. In addition, the automatic focus control device of the invention can readily be built into a camera.

The invention has been described so far as comprising means for detecting whether or not the subject is in focus, and which utilizes the output characteristics of a bridge circuit consisting of photoelectric transducer elements to which a light flux is introduced through a light receiving lens coupled to a taking lens. It will be understood that the invention is not limited to the specifically illustrated form of the means for detecting when the subject is in focus. Thus, any detection means which produces an electric signal when the subject is in focus may be used, as the control device of the invention can perform its function properly if the electromagnet MG is energized by an electric signal produced by any focus detection means.

Additionally, while movable member 2 has been described as formed with the hook 2a, it is not imparative to provide the hook 2a as long as the member 2 can function in the manner described above.

While a specific embodiment of the invention has been shown and described in detail to illustrate the application of the principles of the invention, it will be understood that the invention may be embodied otherwise without departing from such principles.

What is claimed is:

1. An automatic focus control device, for photographic cameras of the type including a rotatable distance setting ring for focusing a taking lens, an adjusting ring for a light receiving lens, a shutter operating button and a shutter release member, said device comprising, in combination, a movable member operable to rotate said distance setting ring to focus the taking lens; a drive member movable in the same direction as said movable member; means biasing said drive member to move in one direction; means operable to move both said members conjointly in the direction opposite to said one direction against the bias of said biasing means; releaseable locking means locking at least said drive member in a predetermined position responsive to said conjoint movement; interengaging means on said members operable to move said movable member in slaved relation to movement of said drive member by said biasing means, upon release of said locking means; signal producing means coupled to said distance setting ring and producing an electrical signal responsive to light reflected from a subject, and received by said signal producing means, in accordance with the distance between the camera and a subject; and electrically operable means connected to said signal producing means and operable by said electrical signal, when the subject is in correct focus, to release said interengageable means for continued movement of said drive member by said biasing means in said one direction and independently of said movable member, which latter remains stationary in a position in which said distance setting ring has been rotated to adjust the taking lens to the correct focus.

2. An automatic focus control device for photographic cameras, as claimed in claim 1, in which said locking means is released responsive to operation of a shutter button; said drive member at the termination of said continued movement, operating a shutter release member to take a picture.

3. An automatic focus control device for photographic cameras, as claimed in claim 1, in which said interengaging means comprises a latch on one of said members and releasably engageable with a pin on the other of said members.

4. An automatic focus control device for photographic cameras, as claimed in claim 1, in which said movable member comprises a longitudinally reciprocable rack meshing with gear teeth on the external periphery of said setting ring; said drive member comprising a slide adjacent said rack and longitudinally reciprocable parallel to said rack.

5. An automatic focus control device for photographic cameras, as claimed in claim 4, in which said interengaging means comprises a hook pivotally mounted on said slide and releasably engageable with a pin on said rack extending laterally toward said slide; said electrically operable means comprising an electromagnet on said slide and operable, when energized, to pivot said hook to release said pin.

6. An automatic focus control device for photographic cameras, as claimed in claim 5, in which at least said slide is formed with a projection on one end; said releaseable locking means comprising a pivoted latch engageable with said projection to restrain said slide and said rack against movement under the bias of said biasing means; said pivoted latch being releasable from said projection by operation of the shutter operating button.

7. An automatic focus control device for photographic cameras, as claimed in claim 6, including means engageable with said rack and said slide, and operable, responsive to advance of the film in the camera, to move said rack and said slide against the bias of said biasing means and as a conjoint unit to a position in which said pivoted latch engages said projection.

8. An automatic focus control device for photographic cameras, as claimed in claim 1, including means coupling said distance setting ring and said adjusting ring for conjoint rotation; said signal producting means including a pair of photoelectric transducers arranged on respective opposite sides of the focal plane of said light receiving lens and having light passing through said light receiving lens impinge thereon.

9. An automatic focus control device for photographic cameras, as claimed in claim 8, in which said electrically operable means comprises an electromagnet operable, when energized, to release said interengaging means; a second pair of photoelectric transducers connected in a bridge circuit with said first mentioned photoelectric transducers; a source of potential connected to the input terminals of said bridge circuit; and a transistorized circuit connected to the output terminals of said bridge circuit; said electromagnet being connected in the output of said transistorized circuit and being energized responsive to balancing of said bridge circuit.

10. An automatic focus control device for photographic cameras, as claimed in claim 9, in which said transistorized circuit includes a pair of first transistors having their bases connected to respective output terminals of said bridge circuit, the output circuits of said first transistors being connected, in opposition to each other, to the base of a second transistor; a second source of potential connected to the output circuit of said second transistor; a third transistor connected, in series with said electromagnet, across said second source of potential and having its base connected to the output circuit of said second transistor; said second transistor being triggered conductive by one of said first transistors when said bridge circuit is unbalanced to form a current by-pass for the base of said third transistor; said second transistor, responsive to balancing of said bridge, being triggered to a blocking state for flow of current from said second source of potential to the base of said third transistor to trigger said third transistor conductive to energize said electromagnet.

* * * * *